US012529698B2

(12) United States Patent
Tien et al.

(10) Patent No.: US 12,529,698 B2
(45) Date of Patent: Jan. 20, 2026

(54) DIAGNOSTIC TESTING DEVICE AND DIAGNOSTIC TESTING METHOD

(71) Applicant: DENKA COMPANY LIMITED, Tokyo (JP)

(72) Inventors: Chihfang Tien, Niigata (JP); Risa Kohiyama, Niigata (JP); Tomomi Takano, Niigata (JP); Takashi Miyazawa, Niigata (JP)

(73) Assignee: DENKA COMPANY LIMITED, Tokyo (JP)

(*) Notice: Subject to any disclaimer, the term of this patent is extended or adjusted under 35 U.S.C. 154(b) by 1043 days.

(21) Appl. No.: 17/279,884

(22) PCT Filed: Sep. 24, 2019

(86) PCT No.: PCT/JP2019/037189
§ 371 (c)(1),
(2) Date: Mar. 25, 2021

(87) PCT Pub. No.: WO2020/066977
PCT Pub. Date: Apr. 2, 2020

(65) Prior Publication Data
US 2022/0034877 A1 Feb. 3, 2022

(30) Foreign Application Priority Data
Sep. 28, 2018 (JP) .................. 2018-183984

(51) Int. Cl.
G01N 33/543 (2006.01)
G01N 21/78 (2006.01)
G06T 7/00 (2017.01)

(52) U.S. Cl.
CPC ....... G01N 33/54387 (2021.08); G01N 21/78 (2013.01); G06T 7/0012 (2013.01)

(58) Field of Classification Search
CPC ....... G01N 33/54387; G01N 33/54388; G01N 21/78; G06T 7/0012
See application file for complete search history.

(56) References Cited

U.S. PATENT DOCUMENTS

2006/0216832 A1  9/2006  Nishikawa et al.
2008/0171397 A1* 7/2008  Hardcastle ......... G01N 21/8483
                                                        436/164
2018/0299385 A1 10/2018  Honda et al.

FOREIGN PATENT DOCUMENTS

CN    108139331 A    6/2018
EP    3 361 238 A1   8/2018
(Continued)

OTHER PUBLICATIONS

Espacenet English Translation of JP2012198083A. (Year: 2012).*
(Continued)

Primary Examiner — Kathryn Elizabeth Limbaugh

(57) ABSTRACT

A technology to determine an appropriate detection region in automatic determination of an immunochromatographic assay and an immunochromatographic assay interpretation device wherein a liquid sample including a detectable substance spreads into a region for detection via a test strip, and a negative or positive determination is made from the coloration state of the detection region, wherein a measuring unit acquires coloration index data for a range including at least a portion of a sample developing detection region for indicating that a sample has reached the detection region downstream from the sample developing detection region in the test strip, and a processing unit specifies the sample developing detection region from the coloration index data, the detection region in a predetermined inter-region distance upstream from the sample developing detection region of the
(Continued)

coloration index data, and interprets negative or positive based on the coloration state of the detection region.

8 Claims, 8 Drawing Sheets

(56) References Cited

FOREIGN PATENT DOCUMENTS

| | | | |
|---|---|---|---|
| JP | H11-83745 A | | 3/1999 |
| JP | 2005-114677 A | | 4/2005 |
| JP | 2005-134211 A | | 5/2005 |
| JP | 2009-133813 A | | 6/2009 |
| JP | 2011-174865 A | | 9/2011 |
| JP | 2012198083 A | * | 10/2012 |
| TW | 200944777 A | | 11/2009 |
| WO | 2017/061494 A1 | | 4/2017 |

OTHER PUBLICATIONS

Oct. 31, 2023 Office Action received in Chinese Patent Application No. 201980063507.2.
Apr. 8, 2021 International Preliminary Report on Patentability issued in International Patent Application No. PCT/JP2019/037189.
Dec. 24, 2019 Search Report issued in International Patent Application No. PCT/JP2019/037189.
May 23, 2022 extended Search Report issued in European Patent Application No. 19867789.0.

* cited by examiner

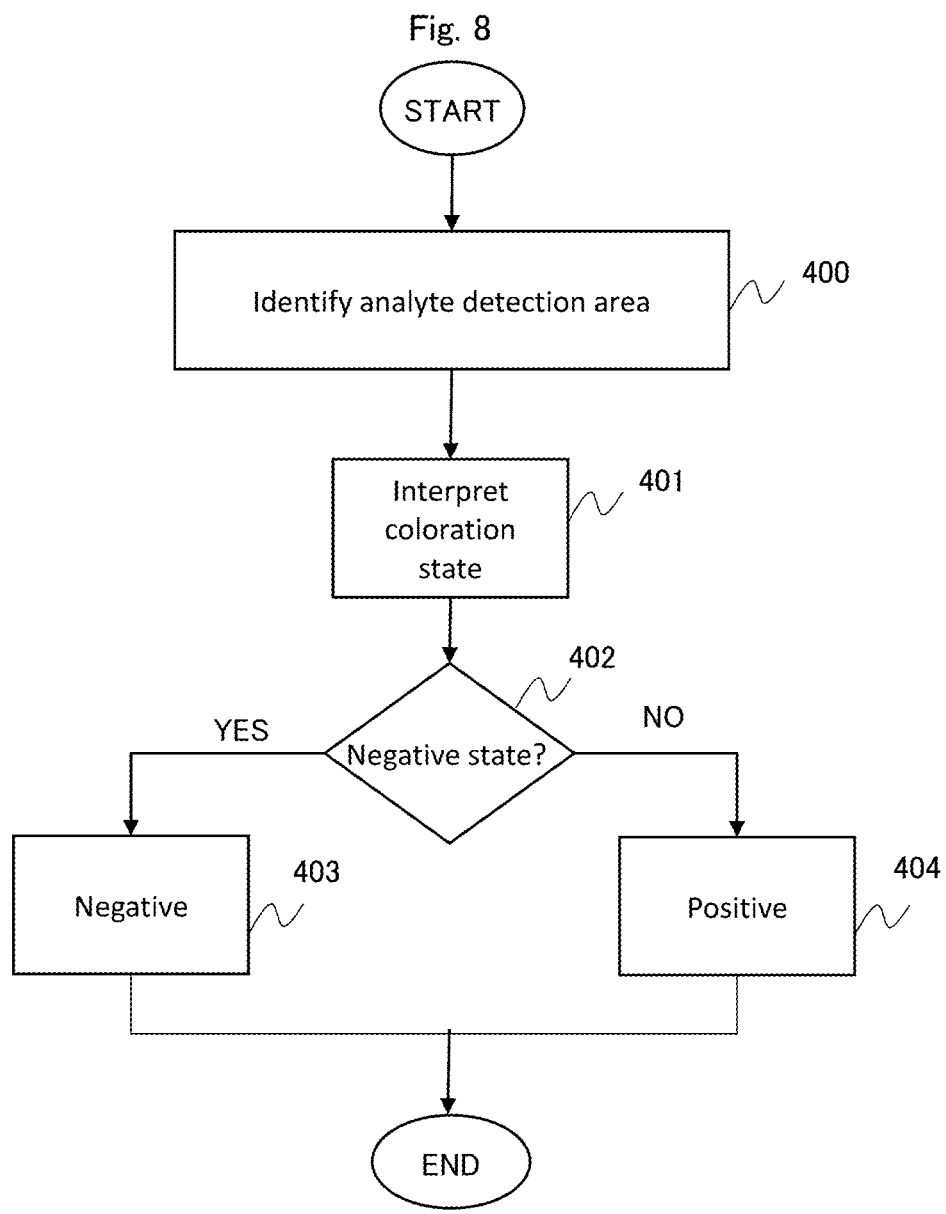

DIAGNOSTIC TESTING DEVICE AND DIAGNOSTIC TESTING METHOD

TECHNICAL FIELD

The present invention relates to technology of identifying a test result from an image of a test strip in testing by immunochromatography.

BACKGROUND ART

When assessing whether or not analyte such as bacteria or viruses or the like are contained (negative/positive) in a sample, such as saliva or the like of a patient, testing by immunochromatography is performed. A test kit, provided with a test strip that exhibits coloration of a different color in a detection area, depending on whether or not the analyte is present or absent, is used for testing by immunochromatography.

A drop area, a labeling-substance-containing area, and a detection area are provided on the test strip in order from the upstream thereof in the direction in which a liquid sample that potentially contains an analyte flows (hereinafter also referred to as "developing direction"). The drop area is an area for dropping the liquid sample. The liquid sample dropped onto the drop area migrates in the developing direction. The labeling-substance-containing area is an area that contains a labeling substance that selectively binds to the analyte and also serves as a label. The labeling substance is a label of a particular color, and binds to the analyte by binding force, for example, antigen-antibody reaction when mixed with the liquid sample. When the liquid sample passes the labeling-substance-containing area, the labeling substance binds to the analyte contained in the liquid sample. The detection area is an area where an immobilizing substance that immobilizes the analyte bound to the labeling substance is fixed. Upon reaching the detection area, the analyte that is bound to the labeling substance is selectively bound to the immobilizing substance, and is immobilized there. The detection area where the analyte bound to the labeling substance is immobilized and accumulated exhibits coloration of a predetermined color by the labeling substance. A tester visually observes the detection area, and makes a negative or positive interpretation from the coloration state.

Also, in some medical settings, a diagnostic testing device has been introduced to reduce the workload on testers. The diagnostic testing-device obtains the image of the detection region of a test strip from a test kit that is inserted, makes a negative or positive interpretation by image processing, and presents an interpretation result (see PTL 1).

CITATION LIST

Patent Literature

Solution to Problem

A diagnostic testing-device according to the present disclosure is a diagnostic testing-device for immunochromatography, in which a liquid sample that potentially contains an analyte is developed in an analyte detection area via a labeling-substance-containing area of a test strip, and an interpretation of negative or positive is made from a coloration state in the analyte detection area. The diagnostic testing-device includes a measuring part and a processing part. The image-capturing part obtains data of a coloration index that is an index relating to a coloration state, for a range including at least part of a position of a sample developing detection area that is downstream in a developing direction from the analyte detection area on the test strip and that indicates, by a coloration state, reaching of the liquid sample thereto. The processing part identifies the sample developing detection area from data of the coloration index, identifies the analyte detection area at a position upstream from the sample developing detection area in the data of the coloration index by a predetermined inter-area distance, and delivers a negative or positive interpretation on the basis of the coloration state of the analyte detection area.

Advantageous Effects of Invention

According to the present disclosure, interpretation can be made in an appropriate detection area in automatic interpretation of testing by immunochromatography.

BRIEF DESCRIPTION OF DRAWINGS

FIG. 8 is a flowchart of interpretation processing.

DESCRIPTION OF EMBODIMENTS

An embodiment of the present invention will be described below with reference to the figures.

Figure 1:
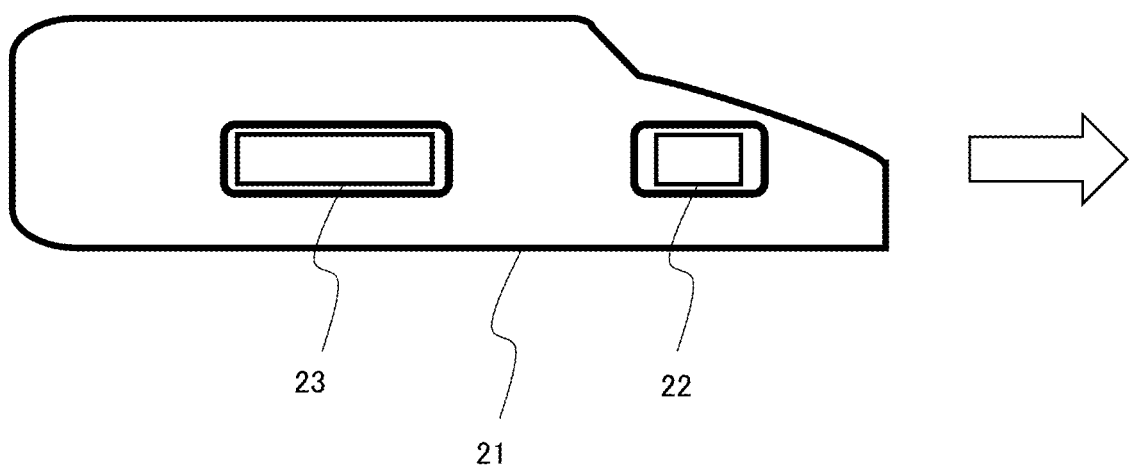
FIG. 1 is a planar view of a test kit.
Figure 2:
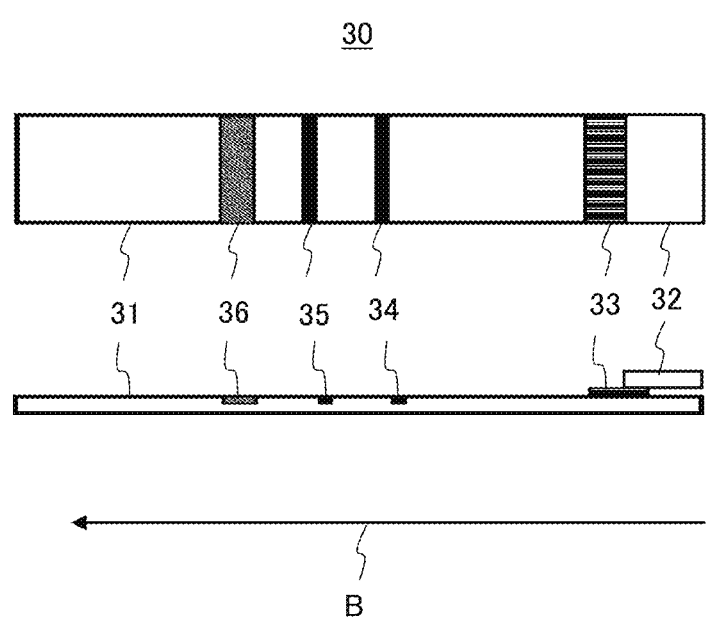
FIG. 2 is a two-view diagram of a test strip.

FIG. 1 is a planar view of a test kit used in the present embodiment. substance is fixed to the sample developing detection area 36. When the liquid sample flows over the sample developing detection area 36, the sample-developing-detecting labeling substance that the liquid sample contains binds to the sample-developing-detecting substance, and is immobilized at the sample developing detection area 36. When the sample-developing-detecting labeling substance is accumulated at the sample developing detection area 36, the sample developing detection area 36 exhibits a predetermined coloration state that is visually recognizable. This coloration state indicates that the liquid sample has passed over the first analyte detection area 34 and the second analyte detection area 35 and migrated to the sample developing detection area 36.

Figure 3:
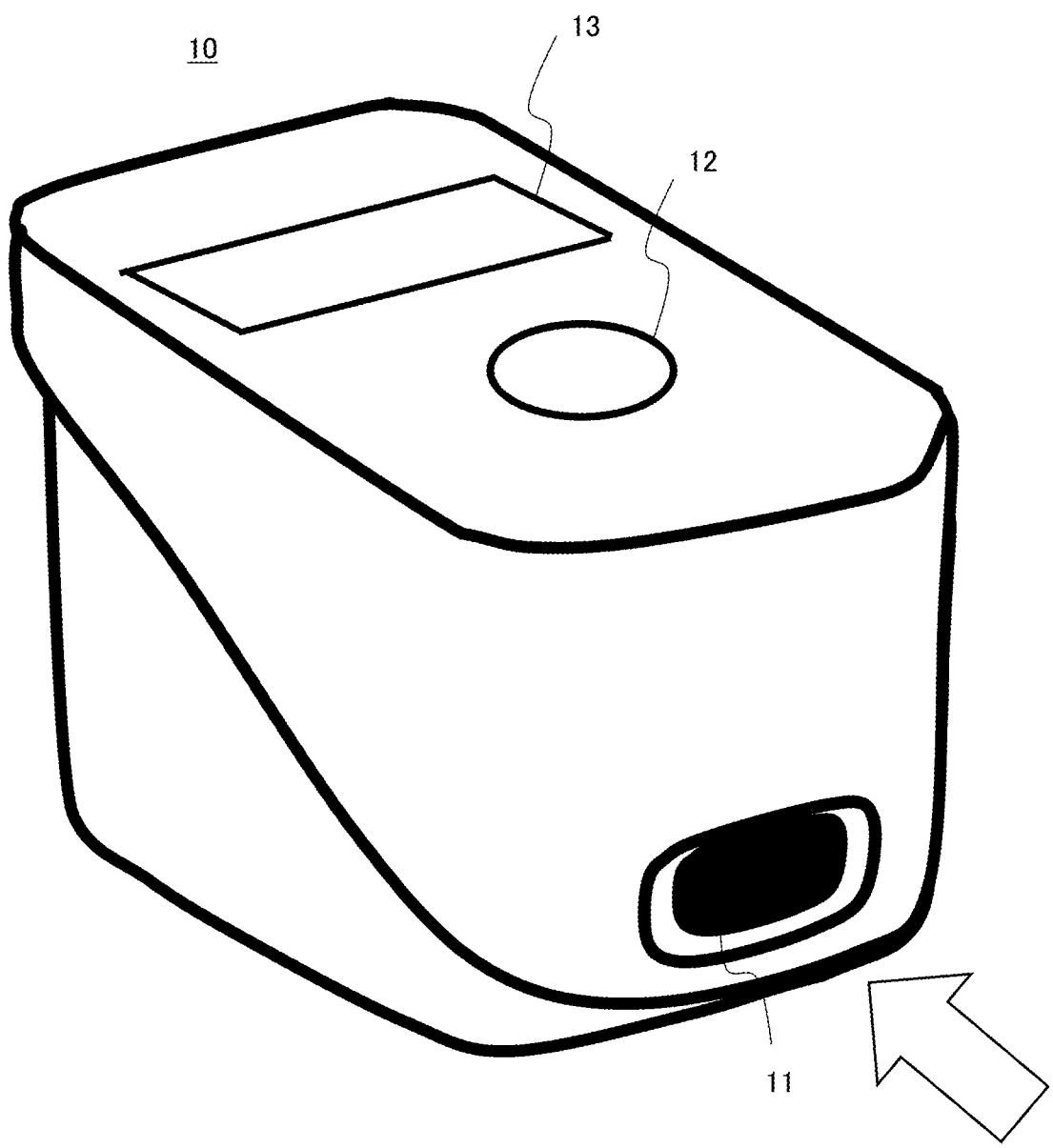
FIG. 3 is a perspective view of a diagnostic testing-device.

FIG. 3 is a perspective view of a diagnostic testing device according to the present embodiment. The diagnostic testing-device 10 is a device that executes the interpretation of the test kit 20 described above, and displays testing results. With reference to FIG. 3, the diagnostic testing-device 10 has a slot 11, an operation button 12, and an display 13. A user inserts the test kit 20 from the slot 11 so as to be loaded to a predetermined position, and operates the operation button 12, upon which the diagnostic testing-device 10 measures the coloration state of the test strip 30 through the result window 23 of the test kit 20, performs interpretation of whether positive or negative regarding the first analyte and the second analyte, on the basis of the interpretation results, and displays the testing results on the display 13.

Figure 4:
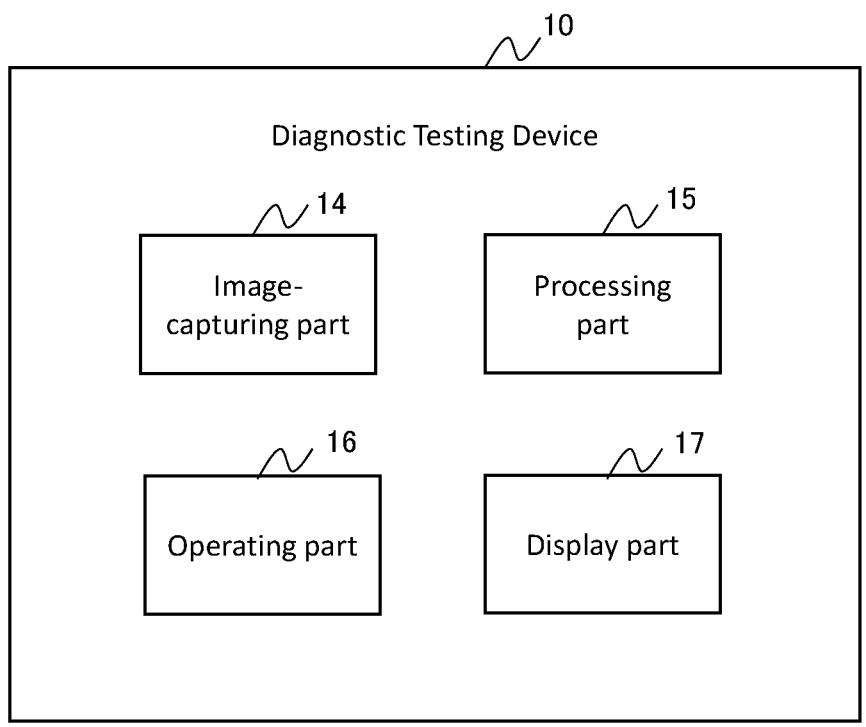
FIG. 4 is a block diagram of the diagnostic testing-device.

FIG. 4 is a block diagram of the diagnostic testing-device. With reference to FIG. 4, the diagnostic testing-device 10 has an image-capturing part 14, a processing part 15, an operating part 16, a display part 17, and a detecting part 18.

The image-capturing part 14 is an image-capturing device that obtains images of the test strip 30 viewed through the result window 23 of the test kit 20 loaded to the predetermined position. For example, the image-capturing part 14 includes a photoemitter (omitted from illustration) and a photoreceptor (omitted from illustration), casts light onto the result window 23 from the photoemitter, and receives reflected light from the result window 23 by the photoreceptor. As one example, the photoemitter may be configured of an LED. The photoreceptor may be configured of a CMOS image sensor. As described above, the result window 23 is provided such that at least part of each of the first analyte detection area 34, the second analyte detection area 35, and the sample developing detection area 36 is externally visible, so by performing image-capturing of a range including the entire result window 23, an image including at least part of each of the first analyte detection area 34, the second analyte detection area 35, and the sample developing detection area 36 can be obtained. Here, it is sufficient to obtain an image of a part to where the coloration state of the first analyte detection area 34, the second analyte detection area 35, and the sample developing detection area 36 can be interpreted. An arrangement may be made in which a predetermined barcode is printed on a sticker, the sticker is applied to a predetermined position near the result window 23 of the enclosure 21 of the test kit 20, and the range for obtaining the image is decided with the barcode on this sticker as a reference. Alternatively, the range for obtaining the image may be decided with a shape of the result window 23 decided in advance as a reference. Alternatively, the range for obtaining the image may be fixedly decided with regard to the position where the result window 23 is situated when the test kit 20 is loaded to the diagnostic testing device 10.

Note that in the present embodiment, as one example, the image-capturing part 14 is an image-capturing device that obtains coloration indices (pixel values) for the entire image at the same time, like a CMOS image sensor, but other configurations may be made. As another example, a scanning device may be used that scans over a range including the result window 23, and receives reflected light of particular wavelengths, thereby sequentially obtaining coloration indices indicating coloration states of the particular wavelengths at each of the parts within the range, which are then handed to the processing part 15 as digital data or image data. In a case of using different colors for each of the first analyte detection area 34, the second analyte detection area 35, and the sample developing detection area 36, scanning is performed for each color, and reflected light is received for each color wavelength.

The processing part 15 is a device that performs interpretation by executing various types of processing on the basis of operations performed as to the operating part 16, and displays interpretation results on the display part 17. For example, the processing part 15 is a microcomputer that has a processor (omitted from illustration) and memory (omitted from illustration), and that executes software programs stored in the memory. The software programs may include firmware and applications. Details of various types of processing that the processing part 15 executes will be described later.

The operating part 16 is a device that communicates, to the processing part 15, operations that the user has performed. For example, the operating part 16 is a press-switch (omitted from illustration) that can assume two states, which are a pressed state and an unpressed state, and that communicates the state thereof to the processing part 15. The processing part 15 can comprehend various types of operations from the state of the operating part 16, such as long-press, short-press, double-press, and so forth.

The display part 17 is a device that displays characters, symbols, images, and so forth, under instruction from the processing part 15. For example, the display part 17 is a liquid crystal indictor (omitted from illustration).

Operations of the diagnostic testing device 10 will be described below.

The user loads the test kit 20 to the diagnostic testing device 10 from the slot 11 and instructs starting of operations by operating the operation button 12, whereupon the processing part 15 starts testing processing. The processing part 15 executes testing processing using the basic operation described above. Specifically, the processing part 15 executes the image-capturing processing and the interpretation processing by the basic operation up to a predetermined maximum count of times that is M times (wherein M is greater than 1, e.g., five times) at predetermined time intervals (e.g., one minute), finalizes to be positive at the stage of interpretation of positive being made in the interpretation processing thereof, and finalizes to be negative when interpretation of negative is made in all M times of the interpretation processing.

Figure 5:
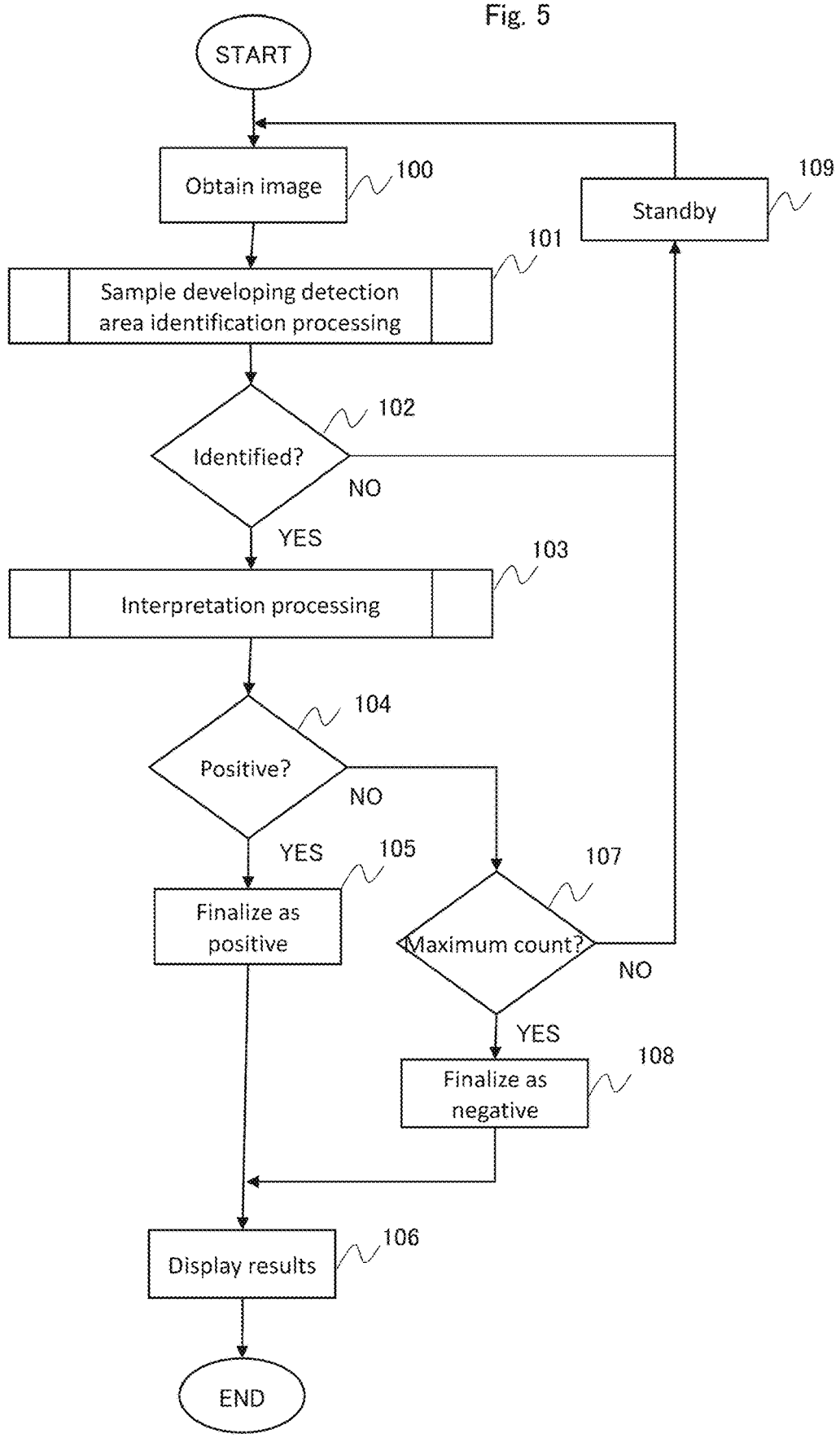
FIG. 5 is a flowchart of testing processing.

FIG. 5 is a flowchart of testing processing.

First, in step 100, the processing part 15 instructs the image-capturing part 14 to perform image-capturing of an image including the result window 23. Next, in step 101, the processing part 15 executes sample-developing-detected area identification processing, and identifies the position of the sample developing detection area 36 in the image. Details of sample-developing-detected area identification processing will be described later.

Next, in step 102, the processing part 15 interprets whether or not the sample developing detection area 36 has been identified. If the sample developing detection area 36 is identified, the processing part 15 executes interpretation processing in step 103. Interpretation processing is processing in which an analyte detection area (first analyte detection area 34 and/or second analyte detection area 35) is identified, and whether the coloration state thereof is in a negative state or in a positive state is interpreted. Details of the interpretation processing will be described later.

Then in step 104, the processing part 15 interprets whether the testing results by the interpretation processing are positive or not. In a case where the testing results are positive, in step 105, the processing part 15 finalizes positive as the final testing results of the test kit 20 at that stage, and displays interpreting results of positive on the display 13 in step 106.

Conversely, in a case where the interpretation results are negative in step 104, in step 107, the processing part 15 interprets whether the count of times that the interpretation processing has been executed (hereinafter also referred to as "interpretation processing execution count") has reached a predetermined maximum count of times (M times) or not. If the interpretation processing execution count has not reached M times, the processing part 15 stands by in step 109 for a predetermined amount of time, and returns to step 100.

Conversely, if the interpretation processing execution count in step 107 has reached the maximum count, this means that an interpretation of negative has been made in all M times of interpretation processing, and accordingly in step 108, the processing part 15 finalizes negative as final testing results of the test kit 20, and displays the testing results of negative on the display 13 in step 106.

Also, the processing part 15 transitions to step 109 in a case where the sample developing detection area 36 was not identified in the above step 102 as well.

Figure 6:
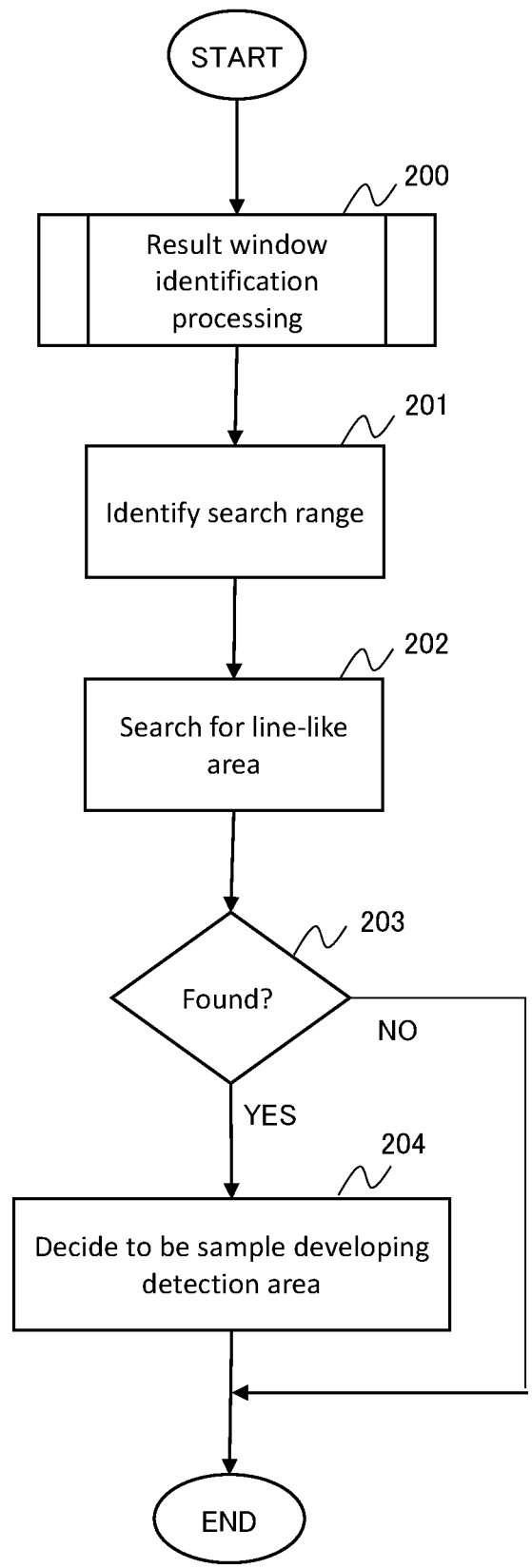
FIG. 6 is a flowchart of sample developing detected area identification processing.

FIG. 6 is a flowchart of sample developing detected area identification processing.

In step 200, the processing part 15 executes result window identification processing. Result window identification processing is processing of searching within the image and identifying the position of the result window 23. Details of result window identification processing will be described later.

Next, in step 201, the processing part 15 identifies a search range for searching for the sample developing detection area 36 from the position of the result window 23. Here, the processing part 15 holds in advance search range information indicating the relative position of the search range as to the result window 23, and identifies the search range at the relative position indicated in the search range information, from the position of the result window 23 identified in step 200.

Further, in step 202, the processing part 15 searches for a predetermined line-like area with the search range identified in step 201 as a search target range. The processing part 15 here holds in advance area width range information in which is set a width range, so as to include a width that can exhibit a predetermined coloration state by the sample developing detection area 36, and searches the search range for the line-like area that indicates the predetermined coloration state and of which the width thereof fits in the range of the width indicated in the area width range information.

Whether the line-like area exhibits the predetermined coloration state or not can be interpreted by comparing an index relating to the coloration state of the sample developing detection area 36 with a predetermined threshold value. Note that the coloration indices are compared with a coloration threshold value for the interpretation of the coloration states of the analyte detection areas 34 and 35 as well, in the same way as the sample developing detection area 36 shown here, which will be described later. However, a value that is several times (e.g., four times) higher than the threshold value used for detection of the analyte detection areas 34 and 35 is preferably used for detection of the sample developing detection area 36, so that stagnation of a reagent in the liquid sample or the like is not erroneously recognized.

Next, in step 203, the processing part 15 interpreted whether or not the predetermined line-like area has been found in step 202. If the line-like area has been found, the processing part 15 decides that line-like area to be the sample developing detection area 36 in step 204.

Figure 7:
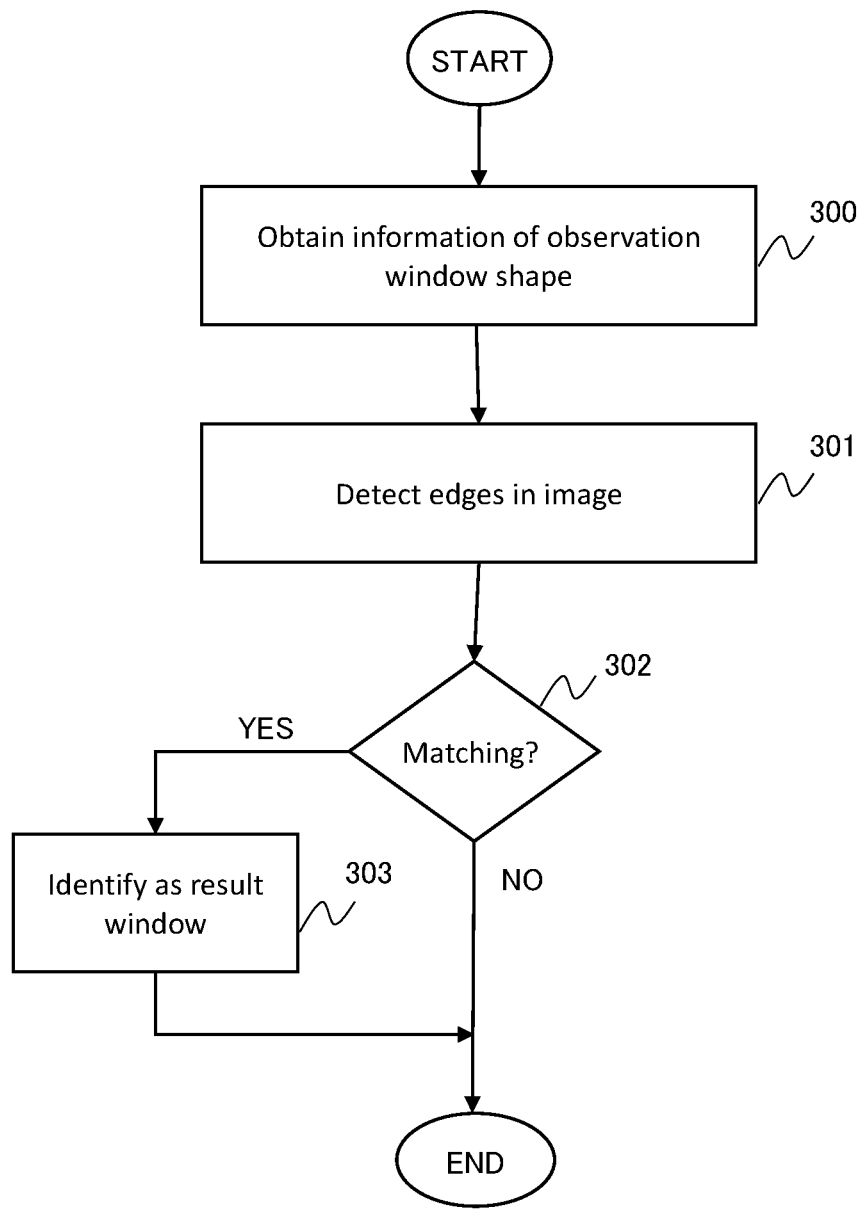
FIG. 7 is a flowchart of result window identification processing.

FIG. 7 is a flowchart of result window identification processing.

The processing part 15 holds in advance result window shape information that indicates the shape of the result window 23 of the test kit 20.

In step 300, the processing part 15 obtains the result window shape information. Next, in step 301, edge detection is performed within the image, by image processing. Thus, edges indicating boundaries of luminosity within the image are detected.

Next, in step 302, the processing part 15 interprets whether or not a curve surrounding a shape matching the shape of the result window 23 shown in the result window shape information is drawn by the edges detected in step 301. If a curve surrounding a shape matching the shape of the result window 23 is drawn by the edges, in step 303, the processing part 15 identifies the portion surrounded by the curve drawn by these edges to be the result window 23.

FIG. 8 is a flowchart of interpretation processing.

In step 400, the processing part 15 identifies analyte detection areas. The processing part 15 here holds, in advance, inter-area distance information indicating inter-area distances between the sample developing detection area 36 and the analyte detection areas, and identifies the analyte detection areas that are at positions upstream from the sample developing detection area 36 by the inter-area distances in the image. As one example, the processing part 15 may hold a first inter-area distance indicating the inter-area distance between the sample developing detection area 36 and the first analyte detection area 34, and a second inter-area distance indicating the inter-area distance between the sample developing detection area 36 and the second analyte detection area 35, as inter-area distance information, and may use these to identify the first analyte detection area 34 and the second analyte detection area 35.

Next, in steps 401-402, the processing part 15 interprets whether the coloration state of the analyte detection area is in a negative state or in a positive state. Specifically, the processing part 15 performs interpretation for each of the first analyte detection area 34 and the second analyte detection area 35.

The processing part 15 compares the value of the coloration index that is an index relating to the coloration state of the analyte detection area with a predetermined coloration threshold value for interpreting whether in a negative state or in a positive state. In an arrangement in which the coloration index is an index that indicates a higher value for positive than for negative, interpretation is made of a positive state if the coloration index exceeds the coloration threshold value, and interpretation is made of a negative state if the coloration index is equal to or smaller than the coloration threshold value. Conversely, in an arrangement in which the coloration index is an index that indicates a higher value for negative than for positive, interpretation is made of a negative state if the coloration index exceeds the coloration threshold value, and interpretation is made of a positive state if the coloration index is equal to or smaller than the coloration threshold value.

The coloration index is an index indicating the coloration state on the basis of pixel values or luminosity of each pixel in the analyte detection area in the image. Also, an arrangement may be made where the image-capturing part 14 is a device that uses densimetery, and the coloration index is reflection intensity or absorbance of a predetermined wavelength, concentration (density) of the labeling substance that is the target component, or the like. In a case where the labeling substance is uniformly distributed, the absorbance is proportionate to the concentration of the labeling substance.

As a concrete example, the coloration index may be an index based on concentration of a predetermined color in accordance with the color of the labeling substance. For example, the concentration of blue (B) and green (G) may be used as the coloration state. Also, the concentration of red (R) and green (G) may be used as the coloration state. The coloration threshold value is a predetermined value that is suitable as a threshold value for the coloration index. For example, an arrangement may be made in which, with regard to each pixel in the analyte detection area, an average value of concentration of a predetermined color over a predetermined range before and after this pixel (upstream and downstream in the developing direction) is the coloration index, and if the height of a curve indicating the coloration index is equal to or larger than a predetermined coloration threshold value, interpretation of positive is made, and if smaller than the coloration threshold value, interpretation of negative is made.

If the coloration state of the analyte detection area is in a negative state, the processing part 15 interprets this analyte in this image to be in a negative state in step 403. Conversely, if the coloration state of the analyte detection area is in a positive state, the processing part 15 interprets this analyte in this image to be in a positive state in step 404.

As described above, according to the present embodiment, the diagnostic testing device 10 is a testing-interpretation device for immunochromatography, in which a liquid sample that potentially contains an analyte is developed in the analyte detection areas 34 and 35 via the labeling-substance-containing pad 33 of the test strip 30, and an interpretation of negative or positive is made from the coloration states exhibited by the analyte detection areas 34 and 35. The image-capturing part 14 obtains an image so as to include at least part of the position of the sample developing detection area 36 that is downstream of the analyte detection areas 34 and 35 in the developing direction on the test strip 30 and that exhibits a coloration state indicating that the liquid sample has reached there. The processing part 15 identifies the sample developing detection area 36 from that image, identifies the analyte detection areas 34 and 35 at positions upstream from the sample developing detection area 36 by the predetermined inter-area distances, and interprets whether negative or positive on the basis of the coloration states exhibited by the analyte detection areas 34 and 35.

Thus, in automatic interpretation in immunochromatography testing, an image is obtained so as to include the position of a sample developing detection area (control line), the sample developing detection area 36 in the image is identified, and the analyte detection areas 34 and 35 at positions upstream from the sample developing detection area 36 by the predetermined inter-area distances are identified. Accordingly, even if there are variances in the positions of the test strip 30 and the analyte detection areas 34 and 35 in the test kit 20, the positions of the analyte detection areas 34 and 35 can be recognized with good precision, and automatic interpretation in appropriate detection areas can be made.

Also, in the present embodiment, the sample developing detection area 36 is a line-like area extending in a direction orthogonal to the developing direction. The processing part 15 sets in advance a search range set to include at least part of the sample developing detection area 36 and an area width range setting a range of a width so as to include a width in which the sample developing detection area 36 exhibits a predetermined coloration state, searches the search range in the image for a line-like area exhibiting the predetermined coloration state and of which the width is in the area width range, and if there is a relevant line-like area, identifies this line-like area as being the sample developing detection area 36. Due to the search range and the range of width of the sample developing detection area 36 being decided and a line-like area being searched for, the probability of erroneous recognition of the sample developing detection area 36 is reduced. Note that this search range may have a limit position for at least the upstream side in the developing direction set. Alternatively, a limit position on the upstream side in the developing direction and a limit position on the downstream side may be set.

Also, if there are more than one line-like areas in the search range, the processing part 15 may identify the line-like area farthest to the downstream in the developing direction as being the sample developing detection area 36. If there are more than one line-like areas in the search range, the line-like area farthest to the downstream in the developing direction is identified as being the sample developing detection area 36, and accordingly, even in cases in which the sample developing detection area 36 and the analyte detection areas 34 and 35 are in the search range, the sample developing detection area 36 can be correctly identified.

Also, more specifically, the test strip 30 is provided to the enclosure 21 of the test kit 20, and the enclosure 21 has the result window 23 through which at least part of the analyte detection areas 34 and 35 and at least part of the sample developing detection area 36 are externally visible. The processing part 15 has set, in advance, the result window shape that is the shape of the result window 23, the search range set at a predetermined relative position as to the result window 23 so as to include at least part of the sample developing detection area 36 visible through the result window 23, and the area width range setting a width range so as to include a width that exhibits the predetermined coloration state by the sample developing detection area 36. The processing part 15 searches for the result window 23 in the image on the basis of the result window shape, and if there is the result window 23, identifies the search range on the basis of the position of this result window 23, searches the search range for a line-like area exhibiting the coloration state and of which the width is in the area width range, and if there is such a line-like area, identifies this line-like area as being the sample developing detection area 36. The sample developing detection area 36 is searched for with the shape of the result window 23, the search range regarding the result window, and the range of the width of the sample developing detection area (control line) set in advance, and accordingly, the probability of erroneously recognizing the sample developing detection area is reduced.

Note that a limit position may be set for the search range on at least the upstream side in the developing direction. Alternatively, a limit position on the upstream side in the developing direction and a limit position on the downstream side may be set. For example, the limit position may be set on the basis of a limit position on the upstream side of the sample developing detection area 36 in standards or specifications for the test kit 20, set with regard to the position in the enclosure 21 of the test kit 20.

Also, in the present embodiment, the processing part 15 executes the interpretation processing of identifying the analyte detection areas 34 and 35 and interpreting whether negative or positive on the basis of the coloration states of the detection areas, with predetermined time intervals therebetween, up to the predetermined maximum count of times, finalizes positive at the stage of interpreting to be positive in a certain interpretation processing, and finalizes negative at the stage of interpreting to be negative in all of the interpretation processing up to the maximum count of times. Increments of interpretation processing are repeatedly executed with predetermined time intervals therebetween, up to the predetermined maximum count of times, and accordingly, testing and interpretation can be started from the stage of when the liquid sample is flowing over the test strip 30. Also, positive is finalized at a stage of interpretation of positive being made at any one of interpretation processing, and negative is finalized at the stage of interpretation of negative being made in all of interpretation processing up to the maximum count of times. Accordingly, if at a stage where interpretation can be finalized even at a point in time partway through, the interpretation is finalized at that stage, whereby interpretation results can be swiftly finalized.

Also, in the present embodiment, the processing part 15 skips interpretation processing for times in which the sample developing detection area 36 could not be identified from the image, and stands by to the next time. In a case in which the sample developing detection area 36 cannot be identified, a situation in which the predetermined coloration state is not exhibited at the sample developing detection area 36 is presumed, and accordingly accurate interpretation cannot be made even if interpretation processing of the analyte detection areas 34 and 35 is performed at this stage. The interpretation processing is skipped in times in which the sample developing detection area 36 could not be identified in this way, which enables erroneous interpretation to be suppressed, and unnecessary processing to be reduced. Note that if the sample developing detection area 36 cannot be identified even when reaching the maximum count of times, the processing part 15 may make a display on the display 13 to the effect that an error has occurred. Such an error can occur in a case where the user has forgotten to drop the liquid sample on the test kit 20, or in a case where developing of the liquid sample on the test strip 30 is defective. The user can be presented with information that the test ended in an error.

Also, in the present embodiment, an arrangement may be made in which, in subsequent times after the time in which the sample developing detection area 36 is identified from the image, the processing part 15 identifies the positions of the analyte detection areas 34 and 35 from the position of the identified sample developing detection area 36, or uses the analyte detection areas 34 and 35 identified from the position of the sample developing detection area 36. Once the position information of the sample developing detection area 36 or the analyte detection areas 34 and 35 has been identified, usage thereof enables processing to be reduced, since change in the positions of the sample developing detection area 36 or the analyte detection areas 34 and 35 does not readily occur in the test kit 20 during testing. Moreover, the same sample developing detection area 36 or analyte detection areas 34 and 35 can be used in each time, and accordingly interpretation conditions can be unified for each of the plurality of times.

The above embodiment of the present invention is an exemplification for description of the present invention, and is not intended to limit the scope of the present invention to the embodiment alone. One skilled in the art will be able to carry out the present invention in various other forms without departing from the scope of the present invention.

REFERENCE SIGNS LIST

10 Diagnostic testing-device
11 Slot
12 Operation button
13 Display
14 Image-capturing part
15 Processing part
16 Operating part
17 Display part
18 Detecting part
20 Test kit
21 Enclosure
22 Opening part
23 Result window
30 Test strip
31 Sample developing membrane
32 Sample drop pad
33 Labeling-substance-containing pad
34 First analyte detection area
35 Second analyte detection area
36 Sample developing detection area

The invention claimed is:

1. A diagnostic testing device for immunochromatography, in which a liquid sample that potentially contains an analyte is expanded in an analyte detection area via a labeling-substance-containing area of a test strip, and an interpretation of negative or positive is made from a coloration state in the analyte detection area, the diagnostic testing device comprising:
    an imaging sensor that is configured to obtain data of a coloration index that is an index relating to the coloration state, for a range including at least part of a position of a sample developing detection area that is downstream in a developing direction from the analyte detection area on the test strip and that indicates, by the coloration state, reaching of the liquid sample thereto; and
    a processor implemented with hardware that is configured to:
        identify the sample developing detection area from data of the coloration index by comparing the coloration index to a predetermined threshold value, and identify the analyte detection area at a position upstream from the sample developing detection area in the data of the coloration index by a predetermined inter-area distance, and,
        if the sample developing detection area is identified, automatically execute interpretation processing of identifying the analyte detection area and deliver a negative or positive interpretation on the basis of the coloration state of the analyte detection area for up to a predetermined maximum count of times, with a predetermined time interval therebetween,
        finalize a positive result if the analyte detection area is interpreted to be positive a single time in the interpretation processing, and
        finalize a negative result if the analyte detection area is interpreted to be negative in all of the interpretation processing up to and including the maximum count of times,
        for a time in which the sample developing detection area cannot be identified from the data of the coloration index, skip the interpretation processing and stand by until a next time, and
        in a time subsequent to a time in which the sample developing detection area is identified from the data of the coloration index, identify the position of the analyte detection area from the position of the identified sample developing detection area.

2. The diagnostic testing device according to claim 1, wherein
    the sample developing detection area is a line-like area extending in a direction orthogonal to the developing direction, and
    the processor is configured to
        set, in advance, a search range set to include at least part of the sample developing detection area, and an area width range in which a range of a width is set to include a width in which the sample developing detection area exhibits a predetermined coloration state, search the search range, which is in the data of the coloration index, for a line-like area exhibiting the coloration state and of which width is in the area width range, and identify, when there is the line-like area, the line-like area as being the sample developing detection area.

3. The diagnostic testing device according to claim 2, wherein, when there are more than one of the line-like areas in the search range, the processor identifies a line-like area farthest downstream in the developing direction as being the sample developing detection area.

4. The diagnostic testing device according to claim 1, wherein the sample developing detection area is a line-like area extending in a direction orthogonal to the developing direction, the test strip is provided to an enclosure of a test kit, the enclosure being provided with a result window that makes at least part of the analyte detection area and at least part of the sample developing detection area to be visible from outside, and the processor is configured to set, in advance, a result window shape that is a shape of the result window, a search range set at a predetermined relative position relative to the result window to include at least part of the sample developing detection area visible through the result window, and an area width range in which a range of a width is set to include a width in which the sample developing detection area exhibits a predetermined coloration state, search for the result window in the data of the coloration index on the basis of the result window shape, identify, when there is the result window, the search range on the basis of the position of the result window, search the search range for a line-like area exhibiting the coloration state and having a width that is in the area width range, and identify, when there is the line-like area, the line-like area as being the sample developing detection area.

5. A diagnostic testing method for immunochromatography, in which a liquid sample that potentially contains an analyte is developed in an analyte detection area via a labeling-substance-containing area of a test strip, and an interpretation of negative or positive is made from a coloration state exhibited by the analyte detection area, the method comprising:

obtaining data of a coloration index that is an index relating to the coloration state for a range including at least part of a position of a sample developing detection area that is downstream in a developing direction from the analyte detection area on the test strip and that indicates reaching of the liquid sample thereto;

identifying the sample developing detection area from data of the coloration index by comparing the coloration index to a predetermined threshold value;

identifying the analyte detection area at a position upstream, by a predetermined inter-area distance, from the sample developing detection area in the data of the coloration index, in response to the sample developing detection area being identified, automatically executing interpretation processing of identifying the analyte detection area and delivering a negative or positive interpretation on the basis of the coloration state of the analyte detection area for up to a predetermined maximum count of times, with a predetermined time interval therebetween;

finalizing a positive result if the analyte detection area is interpreted to be positive a single time in the interpretation processing, and finalizing a negative result if the analyte detection area is interpreted to be negative in all of the interpretation processing up to and including the maximum count of times, wherein, as for a time in which the sample developing detection area cannot be identified from the data of the coloration index, skipping the interpretation processing and standing by until a next time, and wherein, in a time subsequent to a time in which the sample developing detection area is identified from the data of the coloration index, identifying the position of the analyte detection area from the position of the identified sample developing detection area.

6. A diagnostic testing device for immunochromatography, in which a liquid sample that potentially contains an analyte is expanded in an analyte detection area via a labeling-substance-containing area of a test strip, and an interpretation of negative or positive is made from a coloration state in the analyte detection area, the diagnostic testing device comprising:

an imaging sensor; and a processor implemented with hardware, wherein the imaging sensor is configured to obtain data of a coloration index that is an index relating to the coloration state, for a range including at least part of a position of a sample developing detection area that is downstream in a developing direction from the analyte detection area on the test strip and that indicates, by the coloration state, reaching of the liquid sample thereto, and the processor is configured to identify the sample developing detection area from data of the coloration index by comparing the coloration index to a predetermined threshold value, identify the analyte detection area at a position upstream from the sample developing detection area in the data of the coloration index by a predetermined inter-area distance, and deliver a negative or positive interpretation on a basis of the coloration state of the analyte detection area, wherein the sample developing detection area is a line-like area extending in a direction orthogonal to the developing direction, the test strip is provided to an enclosure of a test kit, the enclosure being provided with a result window that makes at least part of the analyte detection area and at least part of the sample developing detection area to be visible from outside, and the processor is configured to set, in advance, a result window shape that is a shape of the result window, a search range set at a predetermined relative position relative to the result window to include at least part of the sample developing detection area visible through the result window, and an area width range in which a range of a width is set to include a width in which the sample developing detection area exhibits a predetermined coloration state, search for the result window in the data of the coloration index on a basis of the result window shape, identify, when there is the result window, the search range on a basis of the position of the result window, search the search range for a line-like area exhibiting the coloration state and having a width that is in the area width range, identify, when there is the line-like area, the line-like area as being the sample developing detection area, and in response to the sample developing detection area being identified, automatically executing interpretation processing of identifying the analyte detection area.

7. The diagnostic testing device according to claim 1, further comprising:

a housing;

an insertion slot arranged in the housing that is configured to receive the test strip; and a display screen arranged on a side of the housing, wherein the imaging sensor is configured to obtain, from the test strip inserted into the insertion slot the data of the coloration index relating to the coloration state, and wherein the processor is further configured to control the display screen to display the finalized positive result or the finalized negative result.

8. The diagnostic testing device according to claim 7, further comprising a photoemitter that is configured to emit light onto the test strip disposed in the insertion slot, wherein the imaging sensor obtains light emitted by the photoemitter and reflected by the test strip.

\* \* \* \* \*